United States Patent
Bell et al.

(10) Patent No.: US 6,775,142 B1
(45) Date of Patent: Aug. 10, 2004

(54) MAGNETIC DISK DRIVE STORAGE SYSTEM

(75) Inventors: Michael Stephen Bell, Blue Hill, ME (US); Grant Edward Carlson, Florissant, CO (US)

(73) Assignee: Eurologic Systems Limited, Dublin (IE)

( * ) Notice: Subject to any disclaimer, the term of this patent is extended or adjusted under 35 U.S.C. 154(b) by 16 days.

(21) Appl. No.: 10/080,419

(22) Filed: Feb. 22, 2002

Related U.S. Application Data

(60) Provisional application No. 60/270,972, filed on Feb. 22, 2001.

(51) Int. Cl.[7] ................................................ G06F 1/16
(52) U.S. Cl. ..................... 361/725; 361/385; 361/727; 312/223.1; 312/223.2
(58) Field of Search .................. 361/679, 683–685, 361/724–727

(56) References Cited

U.S. PATENT DOCUMENTS

| | | | | |
|---|---|---|---|---|
| 6,064,568 A | * | 5/2000 | Schmitt | 361/685 |
| 6,122,173 A | * | 9/2000 | Felcman et al. | 361/726 |
| 6,282,087 B1 | * | 8/2001 | Gibbons et al. | 361/685 |

FOREIGN PATENT DOCUMENTS

| | | |
|---|---|---|
| WO | WO 01/72173 | 10/2001 |
| WO | WO 01/73790 | 10/2001 |

* cited by examiner

*Primary Examiner*—Darren Schuberg
*Assistant Examiner*—Anthony Q. Edwards
(74) *Attorney, Agent, or Firm*—Oppedahl & Larson LLP

(57) ABSTRACT

An enclosure is shaped with a plurality of opposed pairs of first and second guides, the first guides all substantially coplanar within a first plane, the second guides all substantially coplanar within a second plane. Each pair of guides defines a respective plane, the respective planes of the pairs of guides all parallel to each other, each pair of guides separated by a respective spacing, each pair of guides shaped to receive a respective planar carrier by insertion in a first direction along the pair of guides. The enclosure is shaped to receive a key plate parallel to the first plane and intersecting the first guides, said key plate having a plurality of feature areas, each feature area corresponding to a respective plane of one of the pairs of guides, each feature area presenting a predetermined pattern of barriers to movement in the first direction, the barriers disposed at at least two locations along the first direction. The enclosure includes a plurality of electrical connectors corresponding to respective pairs of first and second guides, each connector disposed between ends of its respective first and second guides and positioned perpendicular thereto.

10 Claims, 12 Drawing Sheets

Keying Schematic for 2 x 3 Pin Layout: 6 possible configurations

Configuration 1

Configuration 4

Configuration 2

Configuration 5

Configuration 3

Configuration 6

(a)

(b)

(c)

(d)

(e)

(f)

US 6,775,142 B1

MAGNETIC DISK DRIVE STORAGE SYSTEM

CROSS REFERENCE TO RELATED APPLICATIONS

This application claims priority from U.S. No. 60/270,972, filed Feb. 22, 2001, which is incorporated herein by reference.

BACKGROUND OF INVENTION

The invention relates generally to magnetic disk drive storage systems, and relates more particularly to a key plate system which protects against insertion of an inappropriate disk drive carrier into a system.

Many challenges face the designer of a magnetic disk drive storage system. In a typical system, there is an enclosure with a number of slots into which disk drive carriers may be inserted. A typical system may have fourteen slots. The disk drive carriers each carry a disk drive. The disk drives work together to provide a highly reliable storage system with a high density of storage. Among the issues are concerns about constructive interference arising out of vibrations in drives of the system and about provision of cooling air. In any of these systems, it is important to design the system so that a user will not inadvertently insert a carrier into the enclosure that is not supposed to be inserted into the enclosure. For example, a product line of disk drive storage systems may include systems that differ from one to the next in important ways. It is desirable to have a standardized enclosure across the product line, and to have standardized disk drive carriers, yet it would be undesirable if a user could insert a carrier from one system into the enclosure of a different system. This may happen because the equipment is supplied to several OEM (original equipment manufacturer) customers, or may happen because the same product line platform is used for various electrical interfaces (e.g. SCSI versus fibre channel, or 2 gigabit fibre channel versus 1 gigabit fibre channel).

One prior-art approach to this problem is to use keying pins in the electrical connectors of the carriers and in the electrical connectors of a backplane located at the rear of the enclosure. This approach has the advantage that keyed connectors are well known and many keyed combinations are able to be configured in a typical keyed-connector scheme. In a system that only has one or two slots requiring keying, this approach can be advantageous, and the high cost of such connectors can be accommodated.

But where the number of slots is large, a keyed-connector scheme is unduly expensive due to the number of such connectors. A keyed-connector system typically has small piece parts that must be assembled into the connectors. There is the danger that of the dozen or more connectors in a drive storage system, one or more connectors might be incorrectly keyed due to incorrect assembly of the keying piece parts. The manufacturer can try to catch such mistakes through testing (for example, inserting each keyed connector into a test jig) but such testing is time-consuming and uses up some of the insertion life of the connector. Worse, there are some keying errors (such as failure to insert a blocking part) that might not be detected by test insertions of a mating connector in a test jig.

A further difficulty with many keying schemes is that they require real estate. A connector-based scheme for example requires an allocation of real estate in a planar area that might otherwise have provided more conductors in a connector. Other keying schemes, such as schemes in which a printed circuit board card edge fits into an edge connector, require control of the width of the card edge. A disk drive carrier enclosure system, due to its dense construction, has very little real estate available for keying schemes. Indeed the width of the carrier is limited because of the need to fit as many carriers as possible into a standard enclosure width (defined by standard equipment rack dimensions).

Another prior-art approach is to have a keying scheme in a single plane within the rails of the carriers. This is usually done with tabs or screws aligning with a matching plate embedded within the enclosure, but only within one plane.

There is thus a great need for a keying system for use in a disk drive storage system that overcomes these difficulties. Such a system would need to avoid some or all of the error-prone insertion of keying piece parts. It would need to provide a straightforward way of keying all slots, a dozen or more in number, identically, preferably in a single assembly step. It would need to have a small overall parts count. Such a scheme must accommodate the necessarily narrow drive carriers of a storage system without using up real estate that is needed for other design purposes. Finally, it should be able to provide assembly customization of at least six combinations at minimal cost, and should be generalizable to a scheme offering more than six combinations.

SUMMARY OF THE INVENTION

An enclosure is shaped with a plurality of opposed pairs of first and second guides, the first guides all substantially coplanar within a first plane, the second guides all substantially coplanar within a second plane. Each pair of guides defines a respective plane, the respective planes of the pairs of guides all parallel to each other, each pair of guides separated by a respective spacing, each pair of guides shaped to receive a respective planar carrier by insertion in a first direction along the pair of guides. The enclosure is shaped to receive a key plate parallel to the first plane and intersecting the first guides, said key plate having a plurality of feature areas, each feature area corresponding to a respective plane of one of the pairs of guides, each feature area presenting a predetermined pattern of barriers to movement in the first direction, the barriers disposed at at least two locations along the first direction. The enclosure includes a plurality of electrical connectors corresponding to respective pairs of first and second guides, each connector disposed between ends of its respective first and second guides and positioned perpendicular thereto.

BRIEF DESCRIPTION OF DRAWINGS

Where possible, like features and elements have been shown with like reference numerals among the figures.

DETAILED DESCRIPTION

Figure 8:
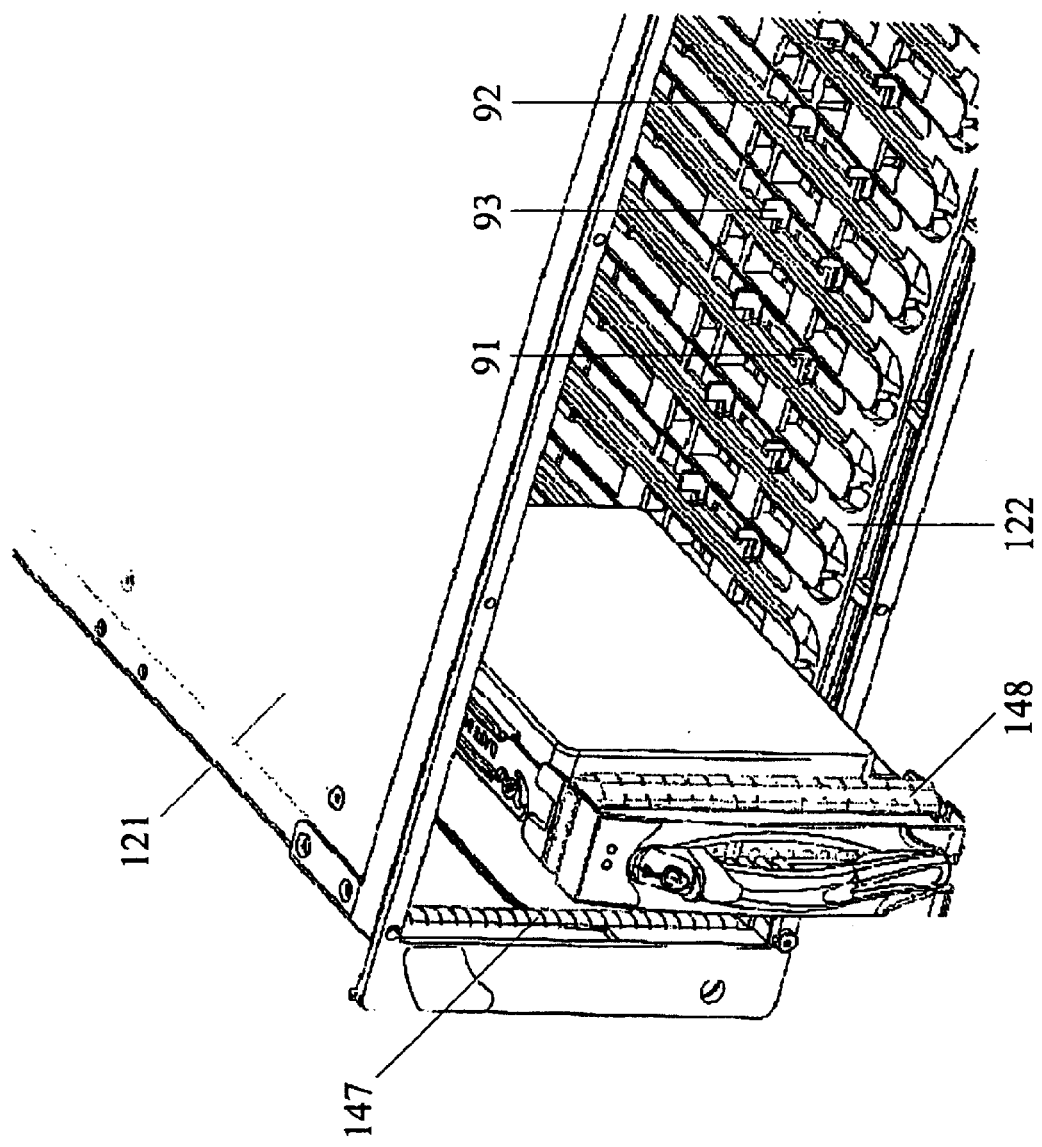
FIG. 8 shows in perspective view a disk drive carrier such as that of FIG. 4 partially inserted into the enclosure of FIG. 7.

Turning first to FIG. 8, what is shown in perspective view is a disk drive carrier 120, partially inserted into the enclosure 121. It should be appreciated that in a functioning system there will normally be a drive carrier 120 for each of the available slots 122 of the enclosure 121. In an exemplary embodiment there are fourteen slots 122 and fourteen carriers 120, so that fourteen disk drives fit into the enclosure 121. Omitted for clarity in FIG. 8 are a connector at the rear of the carrier 120, and a mating connector at the rear of the opening of the enclosure 121, positioned so that when the carrier 120 is fully inserted into the slot 122, the two connectors mate, providing power and data connectivity to a disk drive carried by the carrier 120. Slot 122 defines guides, one at the bottom of the carrier 120 and another at the top of the carrier 120, each guide receiving a respective rail at the top and bottom of the carrier 120. Rail 123 is visible in FIG. 8.

A metal comb 147 is visible at one side of the opening of enclosure 121, and a corresponding comb is at the other side of the opening of enclosure 121, not visible in the view of FIG. 8. The carrier 120 likewise has a metal comb 148 on one side, and a corresponding comb on its other side, not visible in the view of FIG. 8.

A barrier 91 is proximal to the front of the enclosure 121, and additional barriers 93, 92 are further from the front of the enclosure 121. These barriers, in an exemplary embodiment, are provided in each of the fourteen slots 122.

Stated differently, what is shown is an enclosure 121 shaped with a plurality of opposed pairs of first and second guides. A pair of guides is at the top and at the bottom of the carrier 120 when it is inserted. The first guides are all substantially coplanar within a first plane, defining a bottom plane in FIG. 8, and the second guides are all substantially coplanar within a second plane, defining a top plane in FIG. 8. The first and second planes thus define the bottom and top planes, respectively, of the enclosure 121.

Each pair of guides defines a respective plane, and a drive carrier inserted into such a pair of guides is in or parallel to that respective plane. The respective planes of the pairs of guides are all parallel to each other. Each pair of guides is separated from its adjacent pair of guides by a respective spacing. Each pair of guides is shaped to receive a respective planar carrier 124 by insertion in a first direction along the pair of guides.

Figure 3:
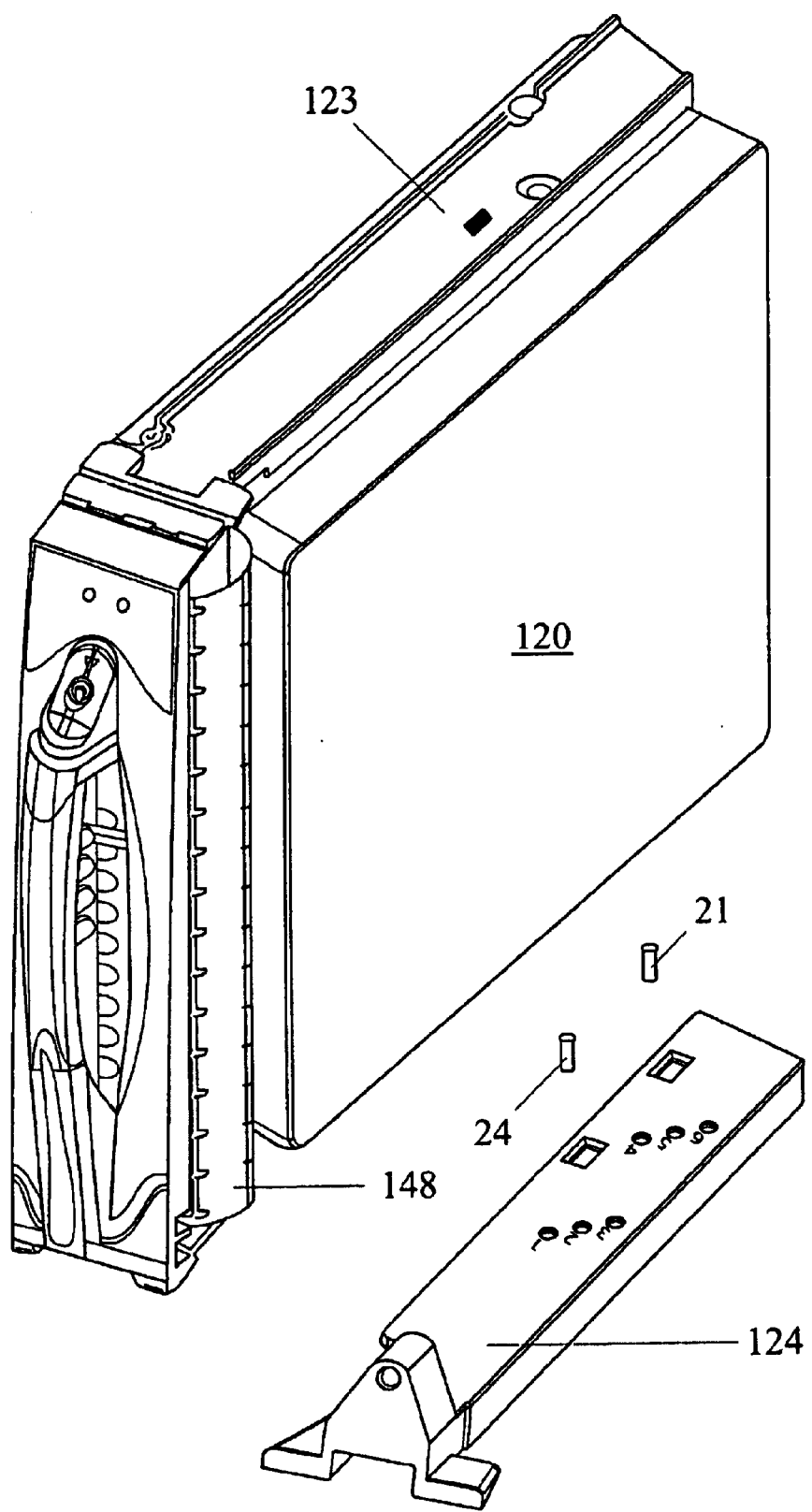
FIG. 3 shows in perspective view a disk driver carrier in exploded relationship to a bottom rail such as that shown in FIG. 2, along with two keying pins.

Turning now to FIG. 3, what is shown is a disk driver carrier 120 in exploded relationship to a bottom rail 124. Six numbered holes may be seen in the bottom rail 124. Keying pins 24, 21 are also shown in exploded view relative to the bottom rail 124. Top rail 123 may also be seen in FIG. 3.

Figure 4:
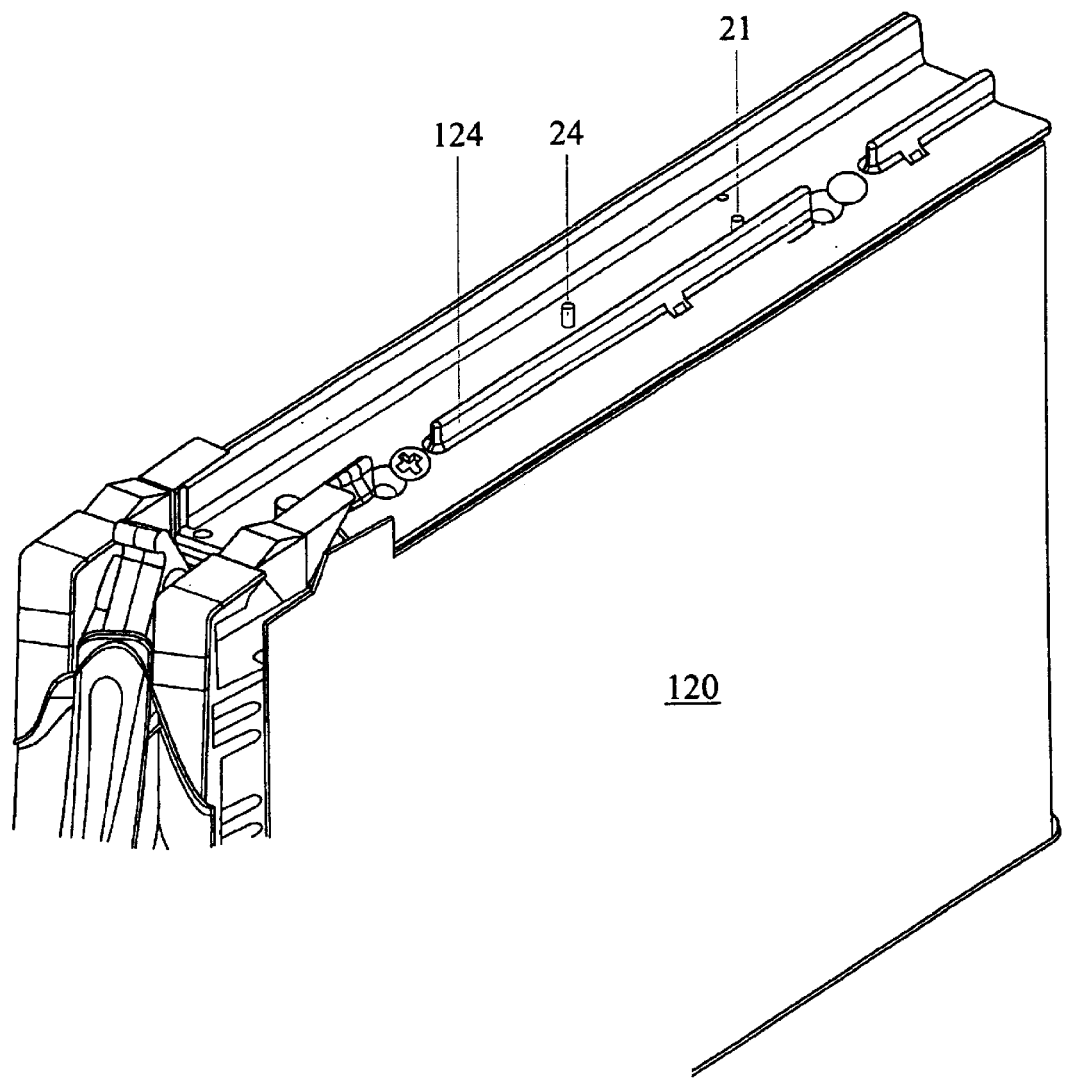
FIG. 4 is a perspective partial view of a drive carrier showing a top rail such as shown in FIG.3.

FIG. 4 is a perspective partial view of a drive carrier 120 showing a bottom rail 124. Pins 24, 21 are in place, and the carrier 120 is ready for insertion into a keyed enclosure. The pins may be 5/64 inch press pins.

It will thus be appreciated that in an exemplary embodiment, each slot in the enclosure 121 has a carrier inserted therein. Such a system thus comprises a plurality of substantially planar rectangular carriers 120 each having a first rail 124 and a second rail 123 parallel to each other, each carrier 120 shaped for insertion into a pair of first and second guides with the first rail engaged to the first guide and the second rail engaged to the second guide, the first rail of each carrier disposed with protruding pins at at least two locations along its length, the pins disposed to pass by a predetermined pattern of barriers.

Each such carrier is a substantially planar rectangular carrier carrying a disk drive, the carrier having fist and second rails parallel to each other, the carrier having an electrical connector along an edge between the first and second rails, the carrier having a handle along the remaining edge, the first rail disposed with protruding pins at at least first and second locations along its length, the first location closer to the electrical connector than the second location.

Figure 7:
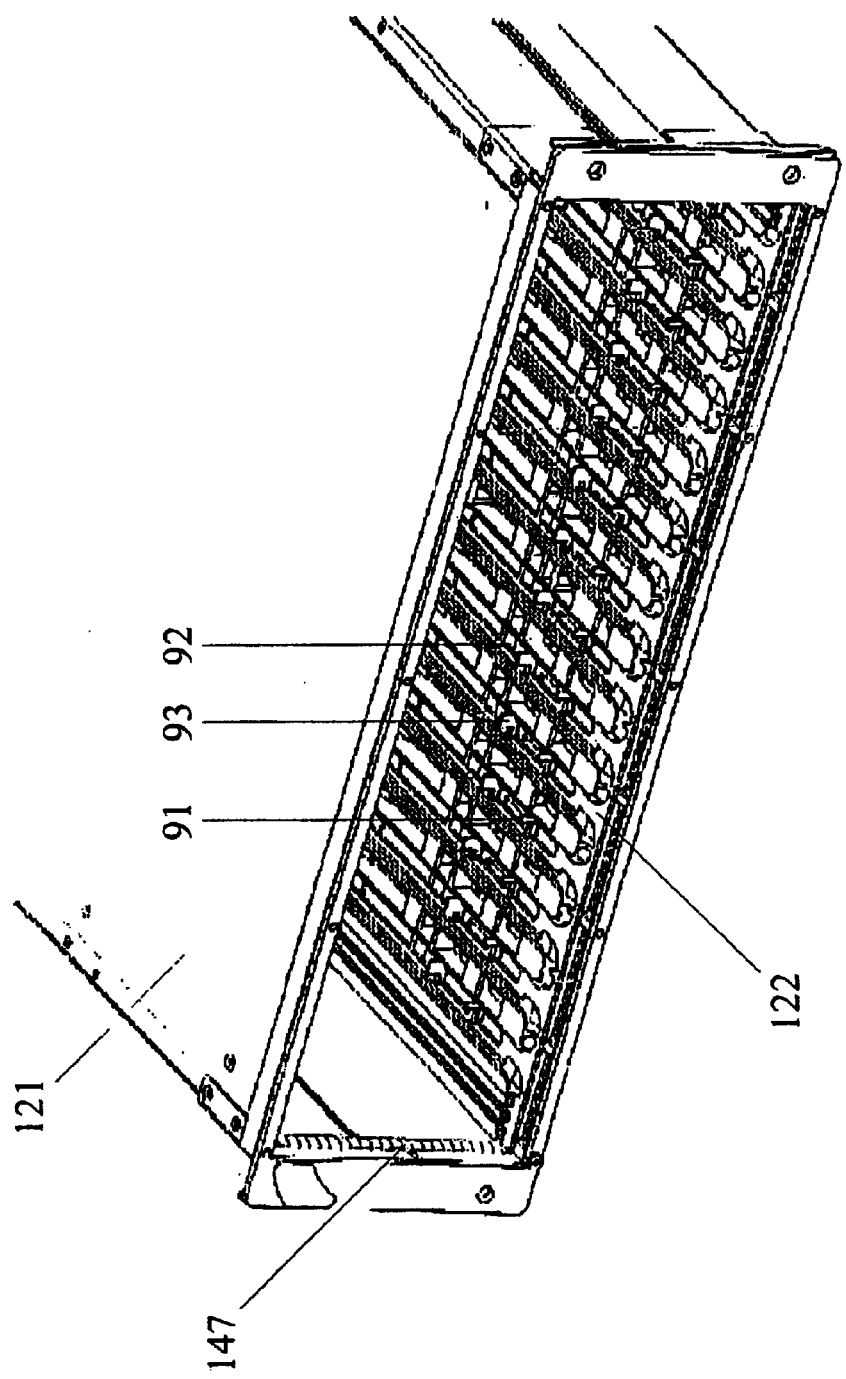
FIG. 7 shows in close-up perspective view the enclosure of FIG. 6, with the key plate seated and its keying barriers visible.

FIG. 7 shows in close-up perspective view an enclosure 121 with fourteen slots 122. Keying barriers 91, 92, and 93 may be seen. These barriers are repeated as feature areas, one for each of the fourteen slots. It will be appreciated that the feature areas are evenly spaced, just like the slots 122. The barriers 92, 93 define a barrier location nearest to the enclosure connectors, and the barriers 91 define a barrier location further from the enclosure connectors. A carrier being inserted will first encounter the barrier location of barriers 91, and will later encounter the barrier location of barriers 92, 93.

Figure 6:
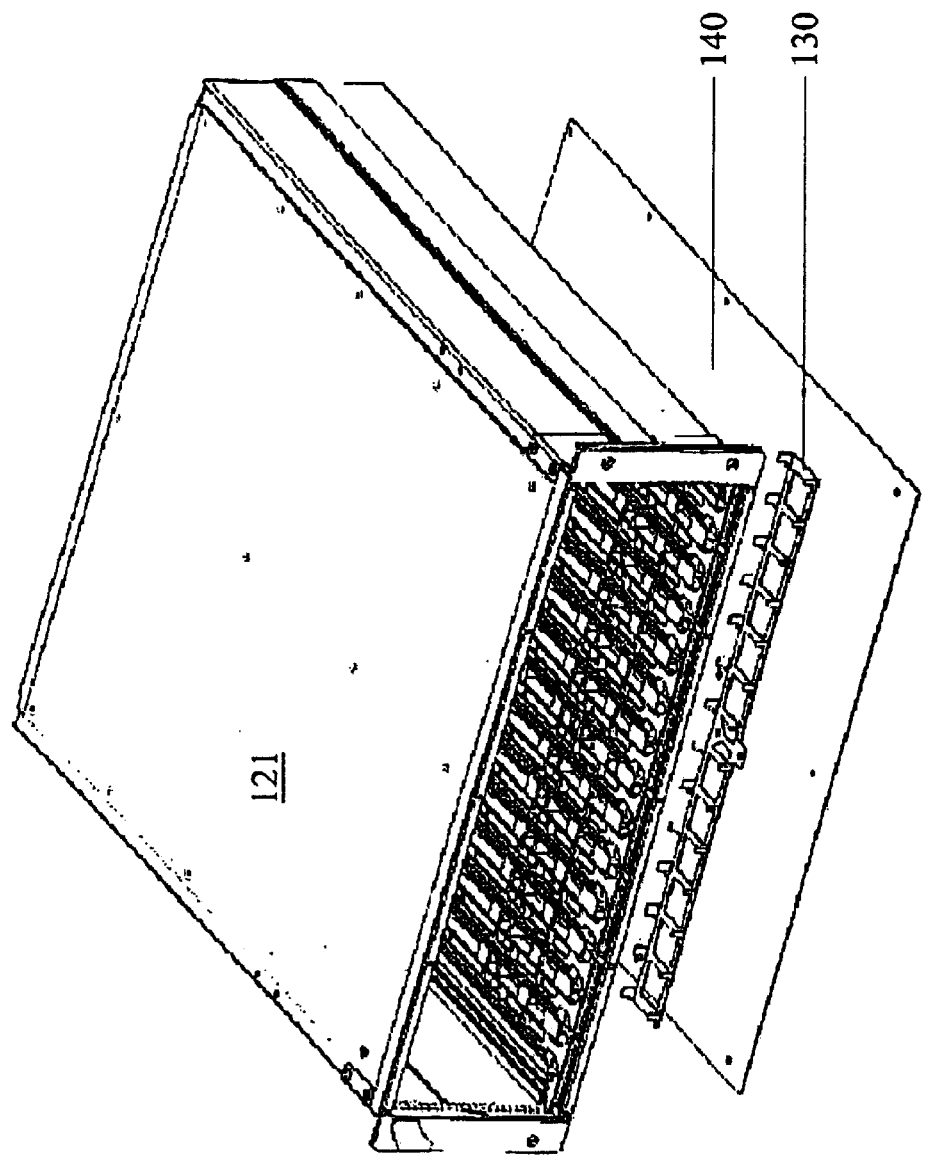
FIG. 6 shows in perspective view an enclosure according to the invention, in exploded relationship to a key plate such as that of FIG. 5.

FIG. 6 show s in perspective view the enclosure 121 according to the invention, in exploded relationship to a key plate 130. As will be more fully appreciated when FIG. 6 is considered in connection with figures discussed below, key plate 130 provides the barriers 91, 92, 93 of FIG. 7. Below key plate 130 in FIG. 6 is a bottom panel 140. In an exemplary embodiment, the enclosure 121 is cast from top and bottom pieces of a magnesium alloy as described in PCT publication number WO 01/2173, assigned to the same assignee as the assignee of the present invention, and incorporated herein by reference. The guides defining slots 122 may have wedges formed there in as described in PCT publication number WO 01/73790, assigned to the same assignee as the assignee of the present invention, and incorporated herein by reference. In such an embodiment, bottom plate 140 may be aluminum or steel, and may be attached by screws or rivets.

It will be appreciated that in an exemplary embodiment, enclosure 121 of FIG. 6 is shaped to receive a key plate 130 parallel to the first plane and intersecting the first guides. This key plate has a plurality of feature areas, each feature area corresponding to a respective plane of one of the pairs of guides, each feature area presenting a predetermined pattern of barriers to movement in the first direction, the barriers disposed at at least two locations along the first direction. In this embodiment, the enclosure further comprises a plurality of electrical connectors corresponding to respective pairs of first and second guides, each connector disposed between ends of its respective first and second guides and positioned perpendicular thereto. The connectors are omitted for clarity in FIG. 6.

Figure 10:
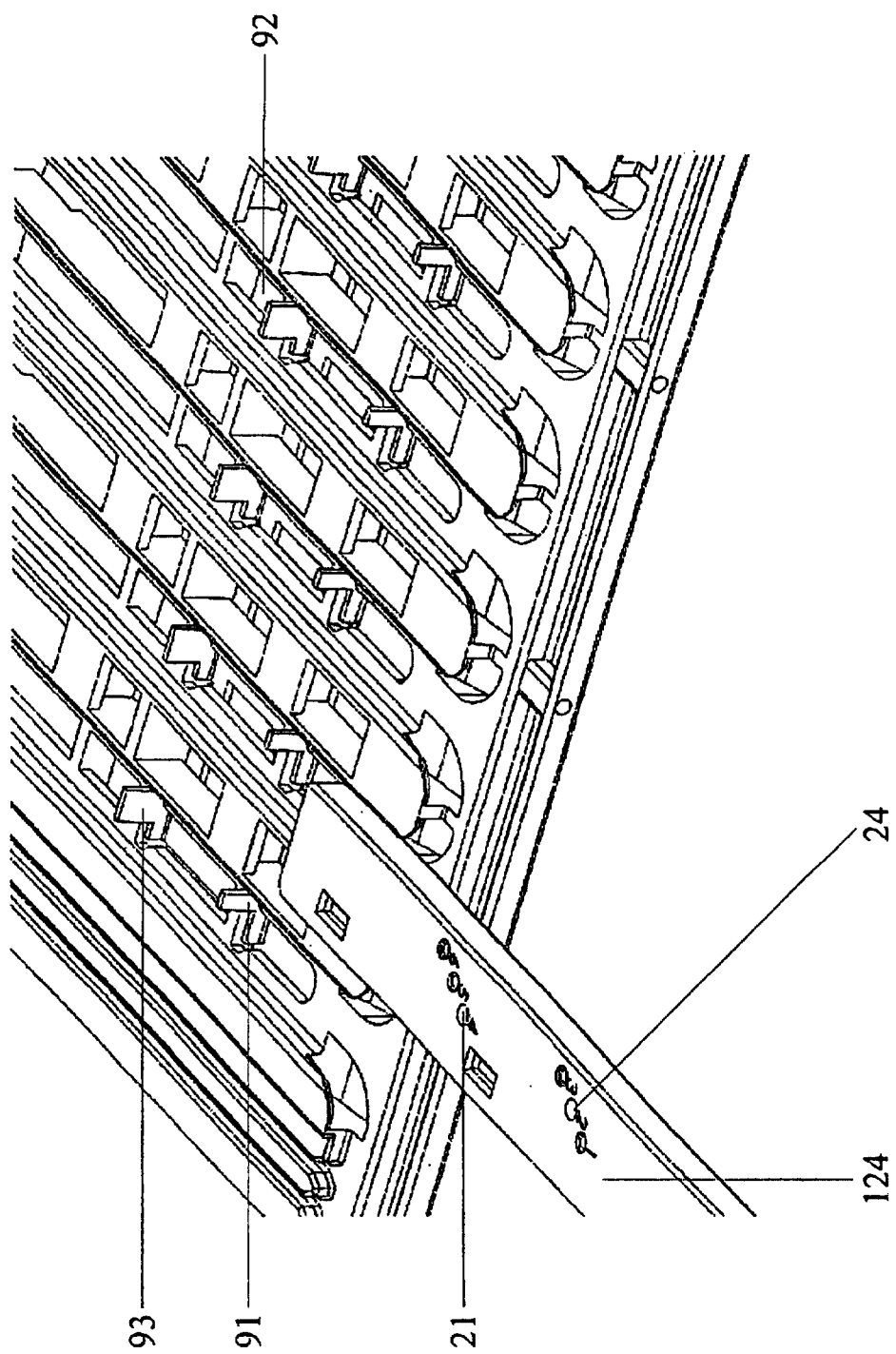
FIG. 10 shows the rail and enclosure of FIG. 9, with the rail inserted to a lesser extent than is shown in FIG. 9.

FIG. 10 shows the rail 124 being inserted into enclosure 121. Pins 21 and 24 are in the rail 124. Barriers 91, 92, and 93 may be seen in the slot into which rail 124 is being inserted. Because of the arrangement of pins (in holes 2 and 4), it is possible to insert the rail 124 fully into the slot.

In FIG. 10, rail 124 has two of its keying holes in use, namely holes numbered 2 and 4. Consider what would happen, given the presence of barriers 91, 92, and 93, if some other keying hole were in use.

If hole 6 were not in use, but hole 3 were in use, then the pin of hole 3 would strike barrier 91. If hole 6 were in use, then the pin of hole 6 would strike barrier 91. In the latter case, the rail 124 would not penetrate as far into the slot as in the former case.

If pin 5 were in use, then the pin of hole 5 would strike barrier 93.

With barriers 91, 92, and 93 as shown in FIG. 10, a pin in hole 1 would have no effect on insertion of the rail 124 into the slot.

It should also be appreciated that barrier 92 is never struck, regardless of which of holes 1, 2, 3, 4, 5 or 6 has a pin in it, because any pin that could strike barrier 92 (namely a pin in hole 6) would previously have struck barrier 91 during insertion.

Importantly, in an exemplary embodiment the barriers 91, 92, 93 are the same in all of the slots. In such an embodiment, the rail 124 may be fully inserted into any of the slots.

It would also be possible to make the barriers different in different slots. With such an arrangement, a rail that would be capable of insertion fully into one slot would not necessarily be capable of insertion fully into another slot.

Figure 9:
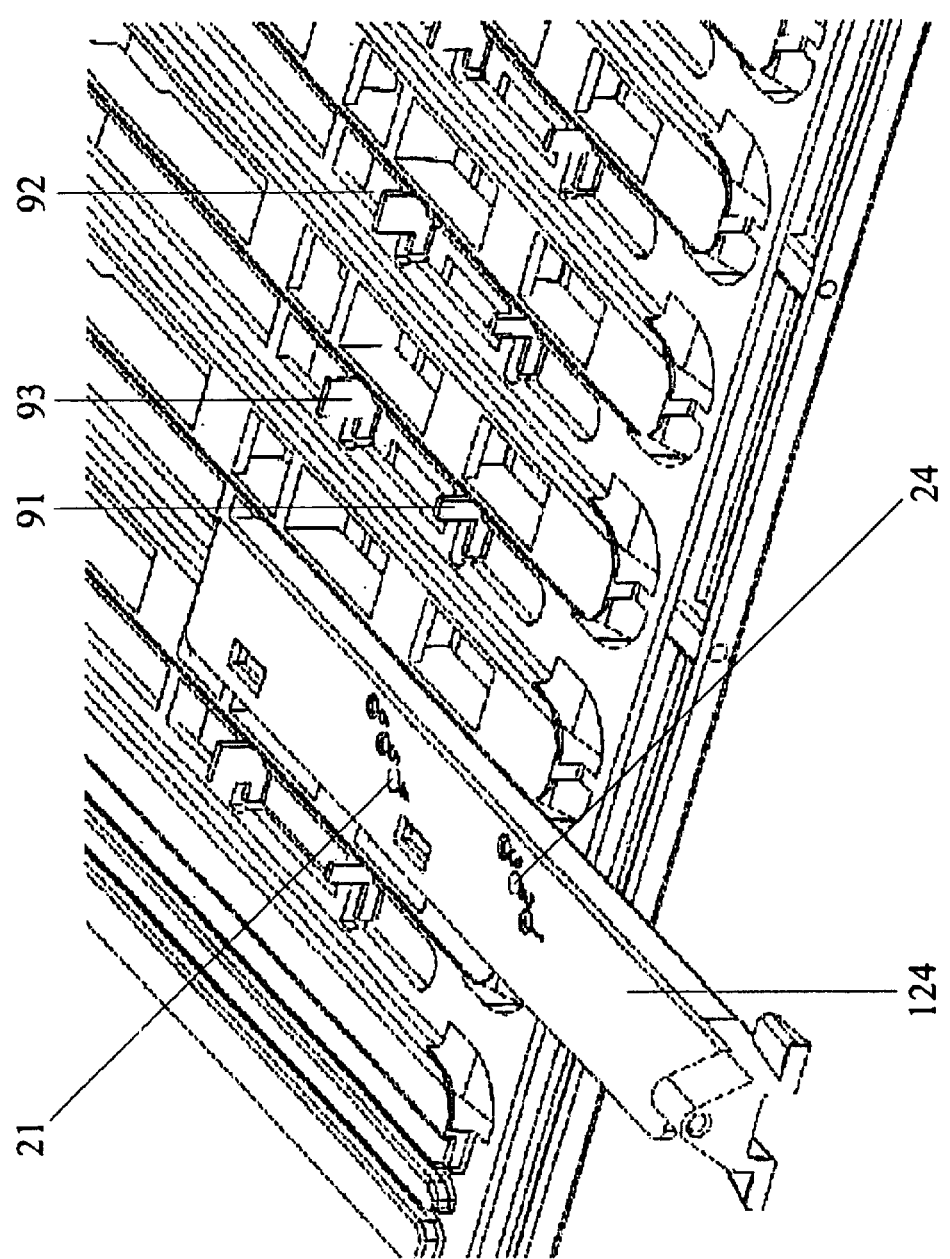
FIG. 9 shows in perspective view a bottom rail such as that of FIG. 2, partially inserted into guides forming part of the enclosure of FIG. 7, with the key plate seated.

FIG. 9 shows further progress with the rail insertion of FIG. 10. In FIG. 9, the rail 124 has been inserted far enough that a pin in holes 4, 5 or 6 has the possibility of engaging with (and striking) a barrier in the region of barrier 91. With yet further progress of insertion, any pin of holes 4, 5 or 6 will have the possibility of engaging with (and striking) a barrier in the region of barriers 92, 93. Likewise at some point during insertion, any pin of holes 1, 2, and 3 will have the possibility of engaging with (and striking) a barrier in the region of barrier 91.

In an exemplary arrangement, the spacing between the region of holes 1, 2, and 3 and the region of holes 4, 5, and 6 is about the same as the spacing between the region of barrier 91 and the region of barriers 92 and 93. This is not, however, required.

One skilled in the art will appreciate that holes 1, 2, and 3 could be in a line perpendicular to the length of rail 124, or could be somewhat staggered as shown in FIG. 9. The same may be said for holes 4, 5 or 6. Staggering the holes tends to separate the holes, which strengthens the rail 124 compared with having the holes close together. Staggering the holes also reduces the risk of an assembly mistake in which a pin is placed in a hole other than the intended hole. Staggering the holes also promotes visual inspection of the pins for correct positioning.

One skilled in the art will likewise appreciate that the layout of holes as shown in FIG. 9 permits three holes across the width of the rail 124. Other keying schemes do not permit as many keying features in the limited width. Still other keying schemes that provide the same or a larger number of keying features would require a wider rail 124, which would (as mentioned above) reduce the number of drive carriers that will fit in a rack width.

One skilled in the art will also appreciate that if it were to be necessary to provide more keying combinations than are offered by the arrangement of FIG. 9, it would be possible to add one or more additional rows of pins and barriers.

Figure 11:
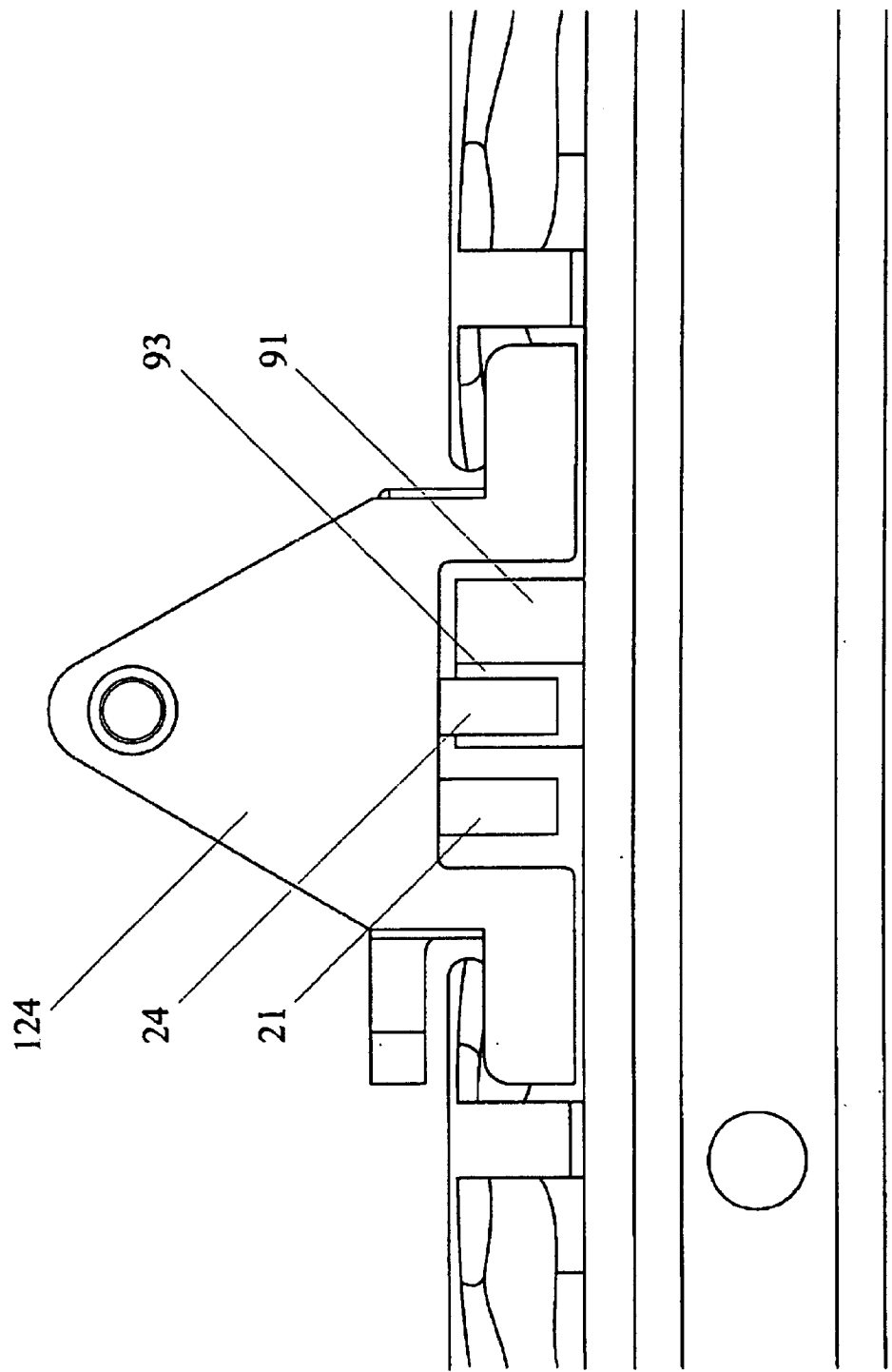
FIG. 11 shows the rail and enclosure of FIGS. 9 and 10, in edge-on view.

FIG. 11 shows the rail 124 and enclosure in edge-on view. The rail 124 is inserted in the direction that is into the page in FIG. 11. Pin 21 is visible, and no barrier is in the line of travel of pin 21. Pin 24 is visible, and behind it may be seen barrier 93. Barrier 91 is also visible.

Figure 2:
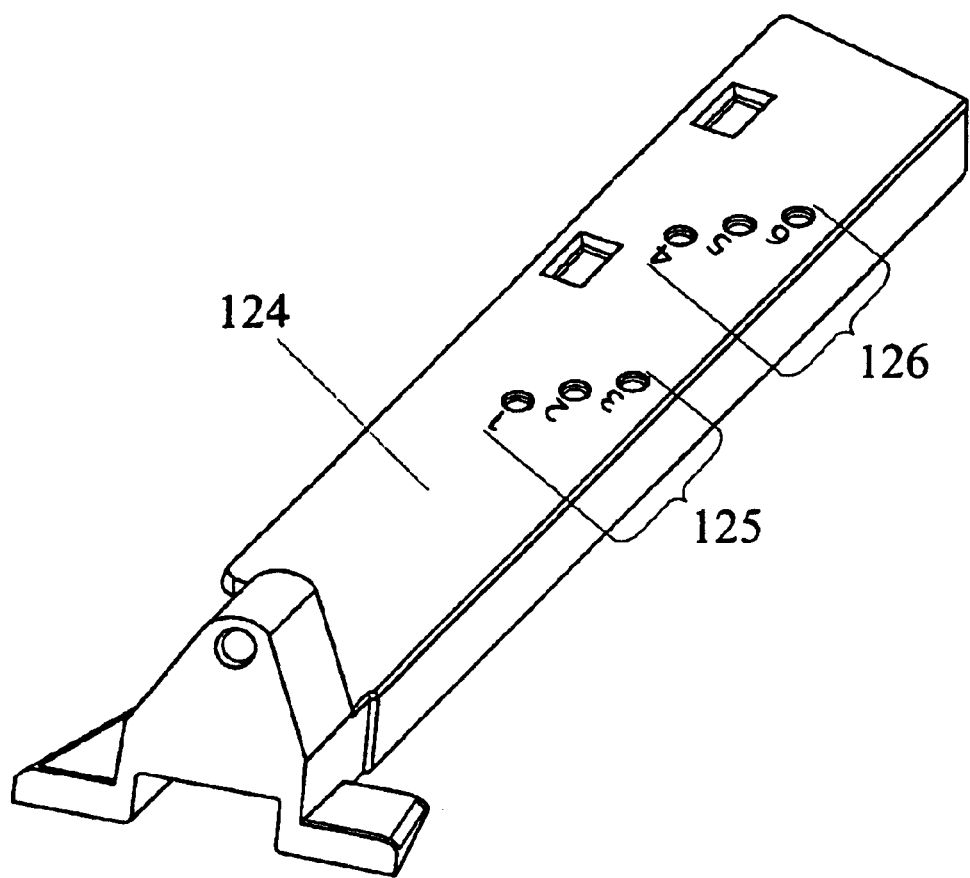
FIG. 2 shows in perspective view a rail disposed to receive keying pins.

FIG. 2 shows in perspective view the rail 124 disposed to receive keying pins. Numbered holes 4, 5 and 6 define a first location 126 which is closer to the enclosure electrical connector, numbered holes 1, 2, and 3 define a second location 125 which is further from the enclosure electrical connector.

Figure 5:
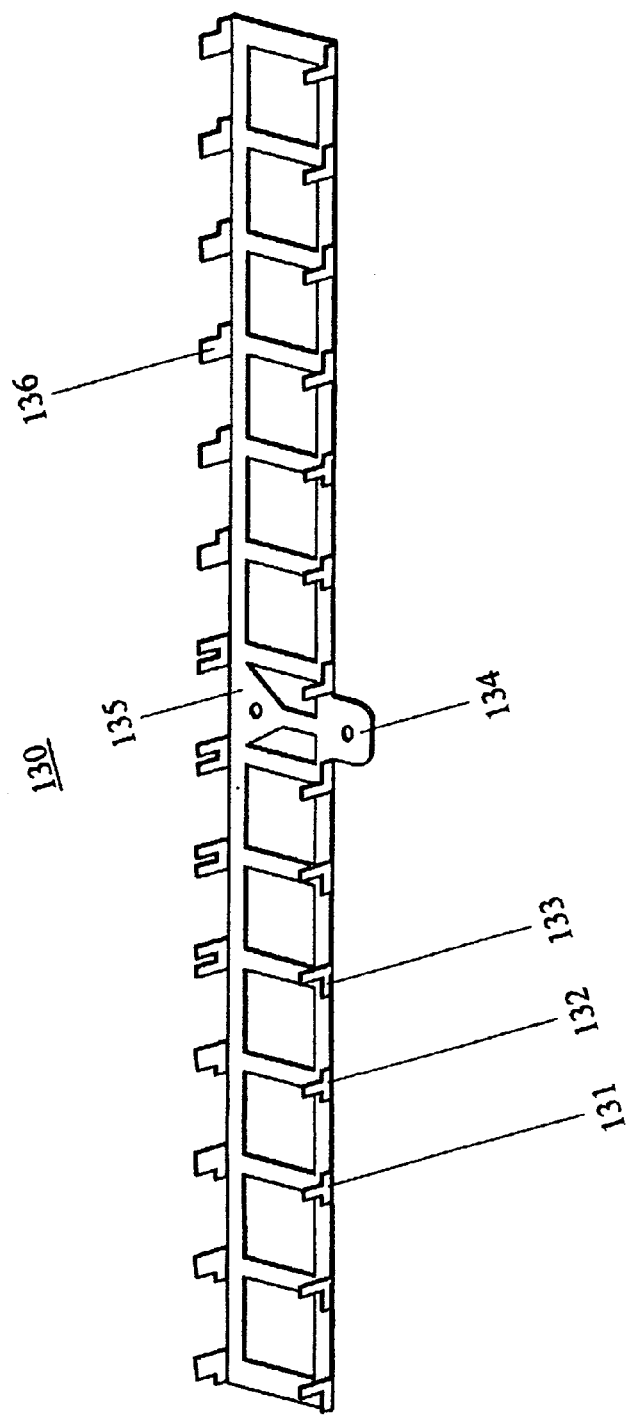
FIG. 5 shows in perspective view a key plate.

FIG. 5 shows in perspective view a key plate 130. The key plate is optionally secured to the rest of the enclosure by means of screws through screw holes 134, 135. Feature areas 131, 132, 133 etc. are, in an exemplary embodiment, equally spaced along the length of the key plate 130. One set of barriers defines a first barrier location 127, and a second set of barriers defines a second barrier location 138. The direction of insertion of a carrier is such that the carrier first encounters the barrier location 138, and later encounters the barrier location 137. It should be emphasized that the key plate shown in FIG. 5 is intended to show each possible keying configuration, all in one plate, for illustrative purposes. In contrast, in an exemplary embodiment the key plate would probably have the same identical keying configuration in all of its positions.

Key plate 130 may be cast, for example from the same alloy as the top and bottom cast halves of enclosure 121. Given the brittleness of some cast alloys, however, it may be preferable to fashion key plate 130 from sheet stock such as steel, that is shaped and then folded to yield the structure of FIG. 5. In an exemplary embodiment, the keying plate is made of punched and formed, 1020 cold-rolled steel. In another embodiment it is possible to use high tensile, heat-treatable sheet steel such as 4130.

It will be appreciated that in an exemplary embodiment, the key plate 130 is substantially linear and, when installed into the enclosure 121, is substantially perpendicular to the first direction, namely the direction of insertion for the disk drive carriers. In such an embodiment, the key plate comprises a substantially linear member elongated in a first direction, the key plate having a plurality of feature areas 131, 132, 133 etc. disposed at equally spaced distances along the first direction, each feature area presenting a predetermined pattern of barriers to movement in a second direction perpendicular to the first direction. The second direction is the direction of insertion of a carrier into the enclosure. The barriers are disposed at at least first and second locations 137, 138. In an exemplary embodiment the pattern of barriers is identical in each of the feature areas. Typically the number of feature areas is at least ten, and may be as many as fourteen.

Figure 1:
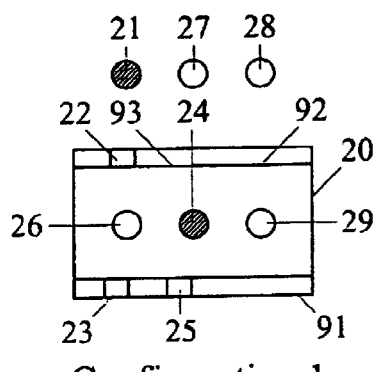
FIG. 1 shows in plan view an exemplary embodiment of a keying scheme in accordance with the invention.
Figure 1:
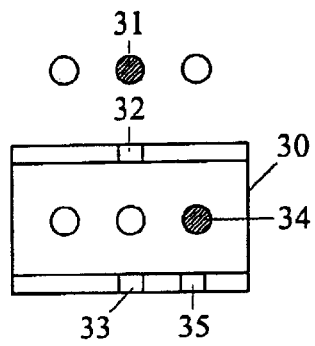
Figure 1:
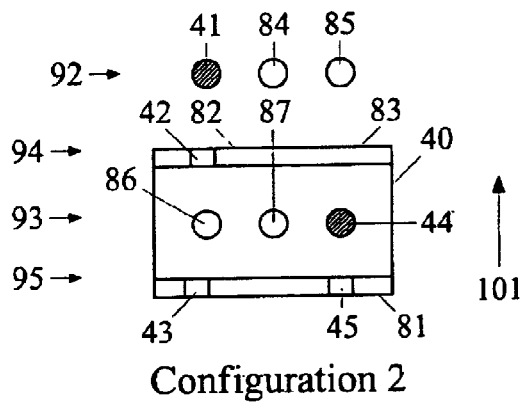
Figure 1:
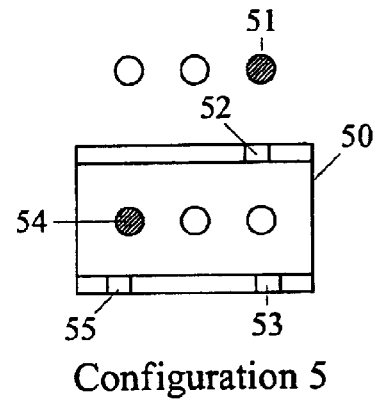
Figure 1:
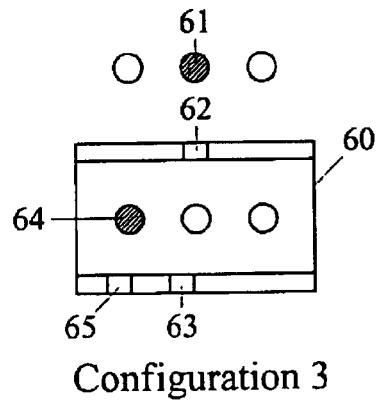
Figure 1:
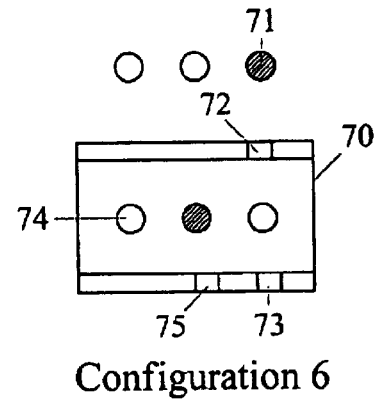

FIG. 1 shows in plan view an exemplary embodiment of a keying scheme in accordance with the invention. Configurations are numbered 1 though 6 in FIG. 1; At configuration 1, it is assumed that pins 21 and 25 are provided in a rail 124, omitted for clarity in FIG. 1. It is assumed that barriers 91, 92, and 93 are provided in one of the feature areas of a key, plate 130, the balance of which is omitted for clarity in FIG. 1. The direction of insertion is upwards in FIG. 1, shown by directional arrow 101. Positions 27, 28, 26, and 29 represent places where pins could be placed but have not been placed. Empty regions 22, 23, 25 represent places where key plate barriers could be placed but have not been placed.

Turning to configuration 2 of FIG. 1, arrow 92 shows a first pin location that is closest to the electrical connectors. Arrow 93 shows a second pin location that is further from the electrical connectors. Arrow 94 shows a third location for barriers that is closest to the electrical connectors, while Arrow 95 shows a fourth location for barriers that is further from the electrical connectors.

The remaining configurations show that six different configurations are possible using the number and arrangement of pin locations and number and arrangements of barrier locations set forth in FIG. 1.

Figure 12:
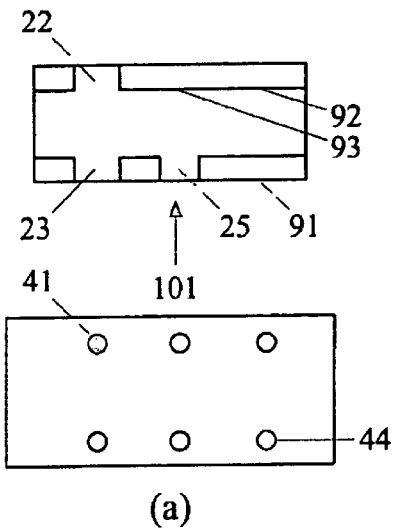
FIG. 12 shows in sequence the insertion of either of two incorrect drive carriers into an enclosure slot.
Figure 12:
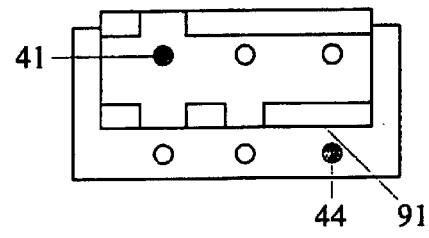
Figure 12:
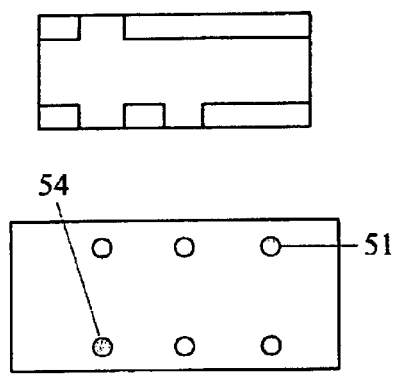
Figure 12:
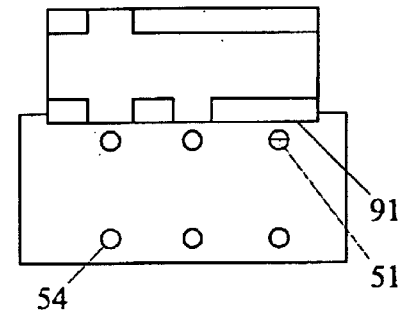
Figure 12:
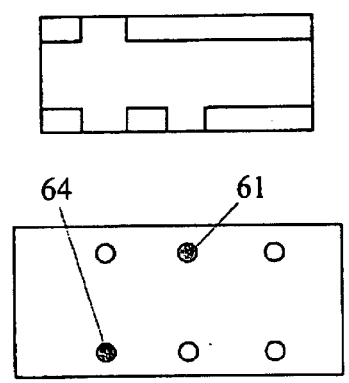
Figure 12:
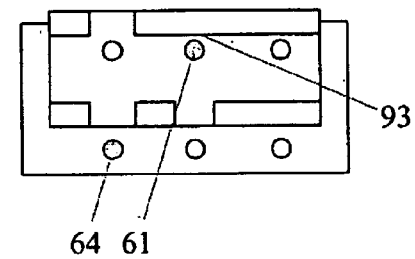

FIG. 12 shows in sequence the insertion of either of two incorrect drive carriers into an enclosure slot In a first example, at (a) is a portion of a rail 124 carrying pins 41, 44. These are to be inserted into a slot with barriers 91, 92, 93. In this example, a collision happens before the electrical connectors are mated, as shown at (b). While the carrier is being inserted, a protruding pin at the second location strikes against a barrier at the fourth location, the first and second electrical connectors failing to be in contact.

In a second example, at (c) a portion of a rail 124 carries pins 51, 54. These are to be inserted into the same slot as is shown at (a) and (b). In this example, a collision again happens before the connectors are mated, as shown at (d). While the carrier is being inserted, a protruding pin at the first location strikes against a barrier at the fourth location, the first and second electrical connectors failing to be in contact.

It will be appreciated that in the example at (b), at collision the rail will have been inserted further than in the example at (d). In either case, the connectors do not mate and the system is protected against incorrect insertion of a carrier. Indeed the connectors do not come close in close proximity with each other.

In a third example, at (e) a portion of a rail 124 carries pins 61, 64. These are to be inserted into the same slot as is shown at (a) and (b). In this example, a collision again happens before the connectors are mated, as shown at (f). It will be appreciated that in the example at (f), at collision the rail will have been inserted the same distance as in the example at (b). In either case, the connectors do not mate and the system is protected against incorrect insertion of a carrier. In such a case, it maybe said that while the carrier is being inserted, a protruding pin at the first location strikes against a barrier at the third location, the first and second electrical connectors failing to be in contact.

Those skilled in the art will readily appreciate that myriad variations of the invention may be devised, none of which depart from the scope of the invention and all of which are intended to be contained within the claims which follow.

What is claimed is:

1. A system comprising:
    an enclosure shaped with a plurality of opposed pairs of first and second guides, the first guides all substantially coplanar within a first plane, the second guides all substantially coplanar within a second plane,
    each pair of guides defining a respective plane, the respective planes of the pairs of guides all parallel to each other, each pair of guides separated by a respective spacing, each pair of guides shaped to receive a respective planar carrier by insertion in a first direction along the pair of guides;
    a key plate parallel to the first plane and intersecting the first guides, said key plate having a plurality of feature areas, each feature area corresponding to a respective plane of one of the pairs of guides, each feature area presenting a predetermined pattern of barriers to movement in the first direction, the barriers disposed at at least two locations along the first direction;
    the enclosure further comprising a plurality of electrical connectors corresponding to respective pairs of first and second guides, each connector disposed between ends of its respective first and second guides and positioned perpendicular thereto.

2. The system of claim 1 wherein the key plate is substantially linear and is substantially perpendicular to the first direction.

3. The system of claim 1 further comprising a plurality of substantially planar rectangular carriers each having a first rail and a second rail parallel to each other, each carrier shaped for insertion into a pair of first and second guides with the first rail engaged to the first guide and the second rail engaged to the second guide, the first rail of each carrier disposed with protruding pins at at least two locations along its length, the pins disposed to pass by the predetermined pattern of barriers.

4. The system of claim 1, further comprising a substantially planar rectangular carrier carrying a disk drive, the carrier having first and second rails parallel to each other, the carrier having an electrical connector along an edge between the first and second rails, the carrier having a handle along the remaining edge, the first rail disposed with protruding pins at at least first and second locations along its length, the first location closer to the electrical connector than the second location.

5. An insertion method for use with a system comprising a carrier and an enclosure, the enclosure shaped with a plurality of opposed pairs of first and second guides, the first guides all substantially coplanar within a first plane, the second guides all substantially coplanar within a second plane, each pair of guides defining a respective plane, the respective planes of the pairs of guides all parallel to each other, each pair of guides separated by a respective spacing, each pair of guides shaved to receive a respective planar carrier by insertion in a first direction along the pair of guides a key plate parallel to the first plane and intersecting the first guides, said key plate having a plurality of feature areas, each feature area corresponding to a respective plane of one of the pairs of guides, each feature area presenting a predetermined pattern of barriers to movement in the first direction, the substantially planar rectangular carrier carrying a disk drive, the enclosure further comprising a plurality of first electrical connectors corresponding to respective pairs of first and second guides, each first connector disposed between ends of its respective first and second guides and positioned perpendicular thereto, the carrier having first and second rails parallel to each other, the carrier having a second electrical connector along an edge between the first and second rails, the carrier having a handle along the remaining edge, the first rail disposed with protruding pins at at least first and second locations along its length, the first location closer to the second electrical connector than the second location, the barriers disposed at at least third and fourth locations along the first direction, the third location closer to the first connector than the second location, the method comprising the steps of:
    inserting the carrier partially into a first pair of guides;
    while the carrier is being inserted, striking a protruding pin at the first location against a barrier at the third location, the first and second electrical connectors failing to be in contact.

6. An insertion method for use with a system comprising a carrier and an enclosure, the enclosure shaped with a plurality of opposed pairs of first and second guides, the first guides all substantially coplanar within a first plane, the second guides all substantially coplanar within. a second plane, each pair of guides defining a respective plane, the respective planes of the pairs of guides all parallel to each other, each pair of guides separated by a respective spacing each pair of guides shaped to receive a respective planar carrier by insertion in a first direction along the pair of guides; a key plate parallel to the first plane and intersecting the first guides, said key plate having a plurality of feature areas, each feature area corresponding to a respective plane of one of the pairs of guides, each feature area presenting a predetermined pattern of barriers to movement in the first direction, the substantially planar rectangular carrier carrying a disk drive, the enclosure further comprising a plurality of first electrical connectors corresponding to respective pairs of first and second guides, each first connector disposed between ends of its respective first and second guides and positioned perpendicular thereto, the carrier having first and second rails parallel to each other, the carrier having a second electrical connector along an edge between the first and second rails, the carrier having a handle along the remaining edge, the first rail disposed with protruding pins at at least first and second locations along its length, the first location closer to the second electrical connector than the second location, the barriers disposed at at least third and fourth locations along the first direction, the third location closer to the first connector than the second location, the method comprising the steps of:

inserting the carrier into a first pair of guides, and bringing the first and second electrical connectors into contact.

7. A key plate comprising a substantially linear member elongated in a first direction, the key plate having a plurality of feature areas disposed at equally spaced distances along the first direction, each feature area presenting a predetermined pattern of barriers to movement in a second direction perpendicular to the first direction, the barriers disposed at at least first and second locations along the second direction, the pattern of barriers being identical in each of the feature areas.

8. The key plate of claim 7, wherein the number of feature areas is at least ten.

9. An insertion method for use with a system comprising a carrier and an enclosure, the enclosure shaped with a plurality of opposed pairs of first and second guides, the first guides all substantially coplanar within a first plane, the second guides all substantially coplanar within a second plane, each pair of guides defining a respective plane, the respective planes of the pairs of guides all parallel to each other, each pair of guides separated by a respective spacing, each pair of guides shaped to receive a respective planar carrier by insertion in a first direction along the pair of guides; a key plate parallel to the first plane and intersecting the first guides, said key plate having a plurality of feature areas, each feature area corresponding to a respective plane of one of the pairs of guides, each feature area presenting a predetermined pattern of barriers to movement in the first direction, the substantially planar rectangular carrier carrying a disk drive, the enclosure further comprising a plurality of first electrical connectors corresponding to respective pairs of first and second guides, each first connector disposed between ends of its respective first and second guides and positioned perpendicular thereto, the carrier having first and second rails parallel to each other, the carrier having a second electrical connector along an edge between the first and second rails, the carrier having a handle along the remaining edge, the first rail disposed with protruding pins at at least first and second locations along its length, the first location closer to the second electrical connector than the second location, the barriers disposed at at least third and fourth locations along the first direction, the third location closer to the first connector than the second location, the method comprising the steps of:

inserting the carrier partially into a first pair of guides;

while the carrier is being inserted, striking a protruding pin at the second location against a barrier at the fourth location, the first and second electrical connectors failing to be in contact.

10. An insertion method for use with a system comprising a carrier and an enclosure, the enclosure shaped with a plurality of opposed pairs of first and second guides, the first guides all substantially coplanar within a first plane, the second guides all substantially coplanar within a second plane, each pair of guides defining a respective plane, the respective planes of the pairs of guides all parallel to each other, each pair of guides separated by a respective spacing, each pair of guides shaped to receive a respective planar carrier by insertion in a first direction along the pair of guides; a key plate parallel to the first plane and intersecting the first guides, said key plate having a plurality of feature areas, each feature area corresponding to a respective plane of one of the pairs of guides, each feature, area presenting a predetermined pattern of barriers to movement in the first direction, the substantially planar rectangular carrier carrying a disk drive, the enclosure further comprising a plurality of first electrical connectors corresponding to respective pairs of first and second guides, each first connector disposed between ends of its respective first and second guides and positioned perpendicular thereto, the carrier having first and second rails parallel to each other, the carrier having a second electrical connector along an edge between the first and second rails, the carrier having a handle along the remaining edge, the first rail disposed with protruding pins at at least first and second locations along its length, the first location closer to the second electrical connector than the second location, the barriers disposed at at least third and fourth locations along the first direction, the third location closer to the first connector than the second location, the method comprising the steps of:

inserting the carrier partially into a first pair of guides;

while the carrier is being inserted, striking a protruding pin at the first location against a barrier at the fourth location, the first and second electrical connectors failing to be in contact.

* * * * *